US008588481B2

(12) United States Patent
Lee

(10) Patent No.: US 8,588,481 B2
(45) Date of Patent: Nov. 19, 2013

(54) FACIAL RECOGNITION METHOD FOR ELIMINATING THE EFFECT OF NOISE BLUR AND ENVIRONMENTAL VARIATIONS

(75) Inventor: Wei Ting Lee, New Taipei (TW)

(73) Assignee: MSI Computer (Shenzhen) Co., Ltd, Shenzhen (CN)

( * ) Notice: Subject to any disclaimer, the term of this patent is extended or adjusted under 35 U.S.C. 154(b) by 389 days.

(21) Appl. No.: 13/004,682

(22) Filed: Jan. 11, 2011

(65) Prior Publication Data

US 2012/0087552 A1    Apr. 12, 2012

(30) Foreign Application Priority Data

Oct. 8, 2010   (TW) ............................... 99134449 A

(51) Int. Cl.
   *G06K 9/00*    (2006.01)
   *G06K 9/68*    (2006.01)
(52) U.S. Cl.
   USPC ........... 382/118; 382/103; 382/209; 382/218; 382/219
(58) Field of Classification Search
   USPC ................. 382/103, 117, 118, 209, 217–221
   See application file for complete search history.

(56) References Cited

U.S. PATENT DOCUMENTS

| 2004/0109584 A1* | 6/2004 | Lestideau ...................... 382/103 |
| 2005/0147292 A1* | 7/2005 | Huang et al. .................. 382/159 |
| 2007/0172099 A1 | 7/2007 | Park et al. |
| 2009/0074259 A1 | 3/2009 | Baltatu et al. |

FOREIGN PATENT DOCUMENTS

| JP | 2003323622 A | 11/2003 |
| JP | 2010176304 A | 8/2010 |
| WO | WO 97/21190 A1 | 6/1997 |

* cited by examiner

*Primary Examiner* — Brian Le
(74) *Attorney, Agent, or Firm* — Ditthavong Mori & Steiner, P.C.

(57) ABSTRACT

A facial recognition method for eliminating the effect of noise blur and environmental variations is provided, applicable to a data processing apparatus, to determine whether a current-face-image matches a reference-face-image or not. According to the method, Gaussian Noise blur Reduction or another noise blur reduction method is performed on the current-face-image and the reference-face-image. Furthermore, the current-face-image and the reference-face-image are respectively divided into a plurality of blocks, so as to derive feature-vector sets representing the current-face-image and the reference-face-image. Finally a dynamic threshold value is determined according to environmental variations to be compared with the difference of the feature-vector sets, so as to determine whether a current-face-image matches a reference-face-image.

9 Claims, 17 Drawing Sheets

FACIAL RECOGNITION METHOD FOR ELIMINATING THE EFFECT OF NOISE BLUR AND ENVIRONMENTAL VARIATIONS

CROSS-REFERENCES TO RELATED APPLICATIONS

This non-provisional application claims priority under 35 U.S.C. §119(a) on Patent Application No. 99134449 filed in Taiwan, R.O.C. on Oct. 8, 2010, the entire contents of which are hereby incorporated by reference.

BACKGROUND OF THE PRESENT INVENTION

1. Technical Field

The present invention relates to facial recognition technology, and more particularly to a facial recognition method for eliminating the effect of noise blur and environmental variations.

2. Related Art

Conventionally, authority control of a system, such as passing through an entrance control system or logging into a computer security system, a user must input their account ID and the corresponding password.

The account ID and the password may be input by manual operation or automatic operation via an identification (ID) card, such as a regular ID cards (contact-type ID cards) or an RFID ID card. Risks for manual operation include the account ID and password being forgotten or intercepted. Risks for ID cards include being stolen or illegally duplicated.

In order to avoid these problems, facial recognition has been broadly adopted to serve as an identification mechanism for authority control.

Facial recognition technology is divided into two stages. The first stage is the learning stage, and the second stage is the face recognizing stage. In the face learning stage a facial image of a user's face is captured and then converted into digital data through a digitization process, so as to record the features of the user's face in the form of digital data. In the face recognizing stage, a facial image of an unknown face to be recognized is also captured and then converted into digitized data through the aforementioned digitalization process, so as to reflect the features of the unknown face by the digitized data. Finally, two sets of digital data are compared to determine whether or not the features of the two faces are similar, so as to determine whether or not the unknown face matches user's face.

Approaches of converting a facial image into digitized data to be recognized include Principle Components Analysis, three-dimensional facial recognition, face-feature based recognition, sub-feature-vector comparison, etc. Those approaches have their own advantages and disadvantages. However, they share a common draw back. The environment in which the face to be recognized is located is considerably different from that in the face learning stage; or the facial image to be recognized contains noise blur. As a result, either these environmental factors or the noise blur may result in actually matched face failing to pass the facial recognition stage. To prevent users from frequently failing to pass facial recognition, a comparative threshold of the facial recognition must be lowered. However, a reduced comparative threshold means that a lower safety factor of access control is introduced, and a stranger is more likely to pass facial recognition successfully.

SUMMARY

In response to these problems, the present invention is directed to provide a facial recognition method based on sub-feature-vector comparisons, eliminating the effect of noise blur and environmental variations on the reliability of facial recognition.

The present invention provides a facial recognition method for eliminating the effect of noise blur and environmental variations, applicable to a data processing apparatus, to determine whether or not a current-face-image matches a reference-face-image. The facial recognition method comprises the following steps of:

Providing a feature-vector database storing a reference sub-feature-vector set of the reference-face-image, a reference environmental-state-vector and a dynamic threshold table;

Capturing the current-face-image;

Deriving a current sub-feature-vector set of the current-face-image;

Comparing each sub-feature-vector of the current sub-feature-vector set with a corresponding sub-feature-vector of the reference sub-feature-vector set, to obtain a difference between each sub-feature-vector of the current sub-feature-vector and the corresponding sub-feature-vector of the reference sub-feature-vector set;

Sequencing the differences of the sub-feature-vectors in an order of quantity;

Selecting a specific amount of the differences of the sub-feature-vectors from the smallest one to the largest one, and summing up the selected differences of the sub-feature-vectors to obtain a total difference;

Deriving a current environmental-state-vector of the current-face-image;

Calculating a Euclidean distance between the reference environmental-state-vector and the current environmental-state-vector;

Determining a corresponding dynamic threshold value from the dynamic threshold table according to the Euclidean distance between the reference environmental-state-vector and the current environmental-state-vector, wherein the dynamic threshold table records a plurality of dynamic threshold values, and each of the dynamic threshold values associated with Euclidean distances within a specific range; and Determining whether the total difference exceeds the determined corresponding dynamic threshold value and determining that the current-face-image matches the reference-face-image if the total difference does not exceed the determined corresponding dynamic threshold value.

By means of the facial recognition method for eliminating the effect of noise blur and environmental variations of the present invention, noise blur is reduced before the sub-feature-vector set is derived. The present invention then takes environmental variations into consideration to dynamically select a threshold value after a difference of the sub-feature-vector set is obtained. As a result, the threshold value which is dynamically selected can match environmental variations and improve the reliability of facial recognition.

BRIEF DESCRIPTION OF THE DRAWINGS

The present invention will become more fully understood from the detailed description given herein below for illustration only, and thus are not limitative of the present invention, and wherein.

DETAILED DESCRIPTION

Figure 1:
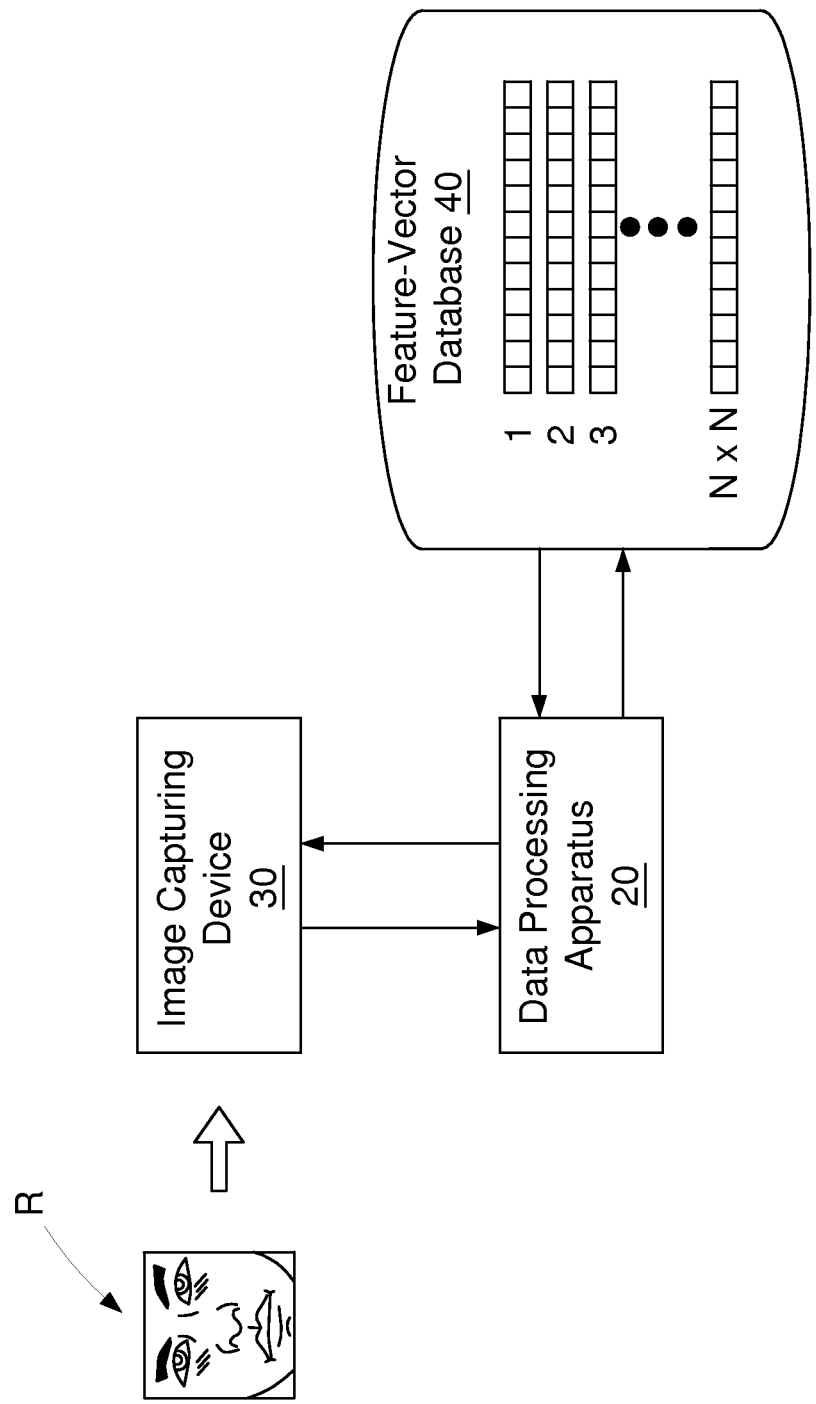
FIG. 1 is a block diagram of a data processing apparatus executing the facial recognition method for eliminating the effect of noise blur and environmental variations of the present invention.
Figure 2:
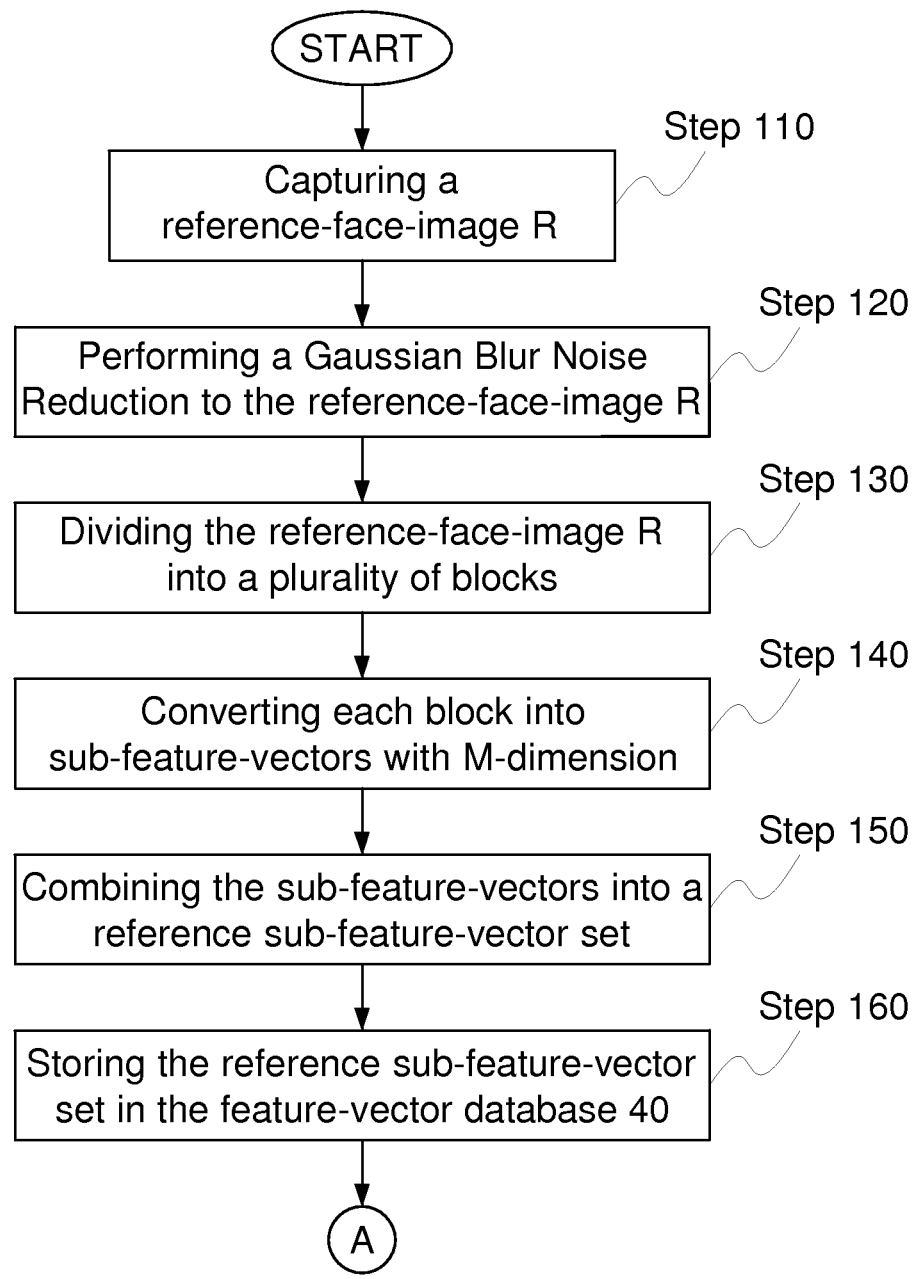
FIG. 2 is the first part of a flowchart of the facial recognition method of the present invention.

Please refer to FIGS. 1 and 2, in which a facial recognition method for eliminating the effect of noise blur and environmental variations is provided according to an embodiment of the present invention, which is applicable to a data processing apparatus 20, to determine whether or not a current-face-image C matches a reference-face-image R, so as to generate a recognition result. A corresponding personal identification can then be extracted according to the recognition result if the current-face-image C matches the reference-face-image R. Thus the recognition result and the corresponding personal identification used to replace an account ID and the corresponding password, so as to simplify the operation to pass access control of the data processing apparatus 20.

The data processing apparatus 20, such as a desktop computer or a laptop computer, is installed with a facial recognition program to execute the facial recognition method for eliminating the effect of noise blur and environmental variations. The data processing apparatus 20 is electrically coupled to a feature-vector database 40 which is disposed independently from the data processing apparatus 20 or built within the data processing apparatus 20. And the data processing apparatus 20 captures the current-face-image C and reference-face-image R through an image capturing device 30.

The facial recognition method of the present invention mainly includes a process of deriving sub-feature-vector set of the facial image. The aforementioned process is not only used in the face learning stage but also used in the face recognizing stage.

As shown in FIG. 1, according to the facial recognition method of the present invention, the image capturing device 30 captures the current-face-image C or reference-face-image R of the user and sends to the data processing apparatus 20. The image capturing device 30 may be a camera which is externally connected to or internally built in the data processing apparatus 20.

Figure 3:
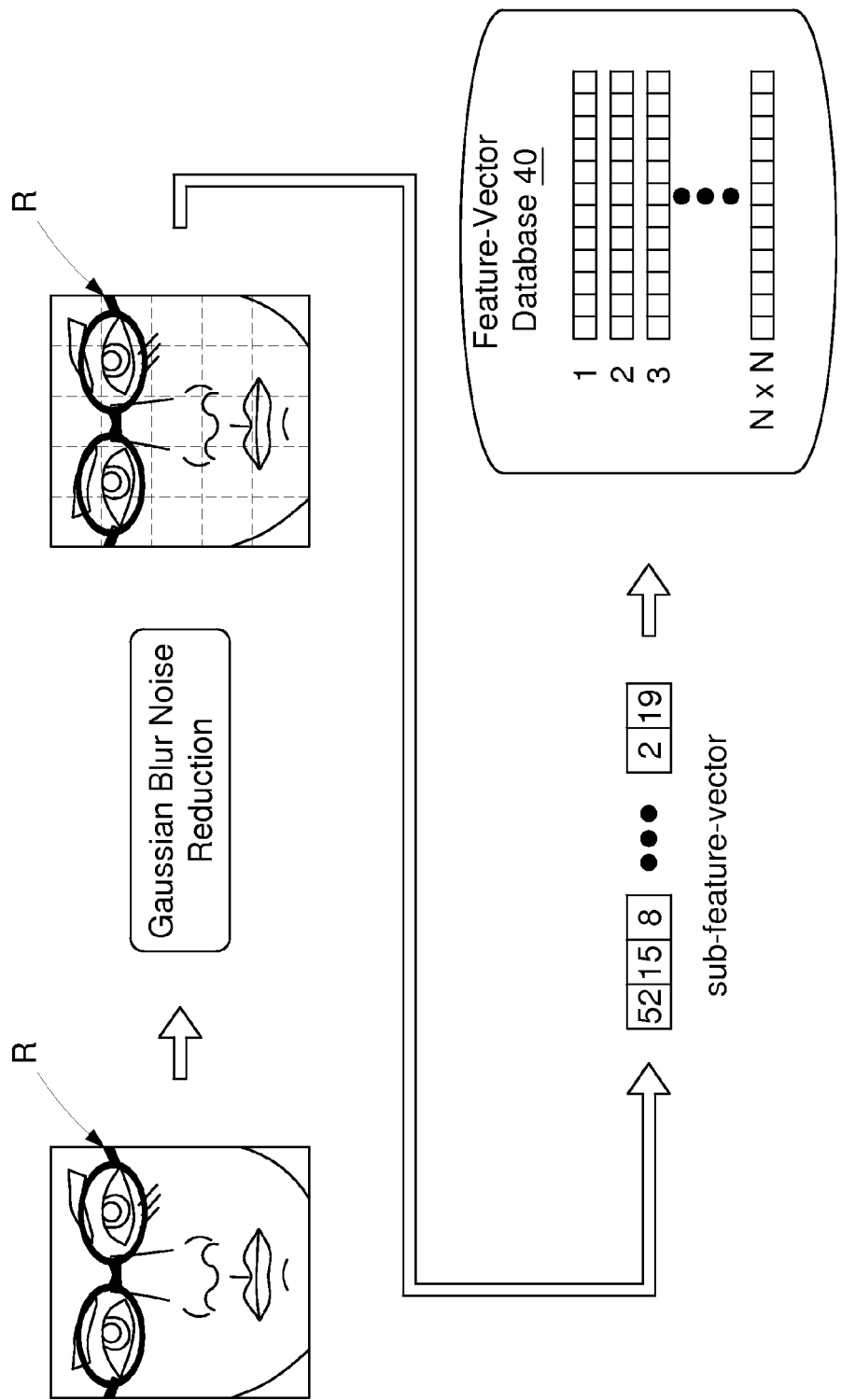
FIG. 3 is a schematic view of converting the reference-face-image into a reference sub-feature-vector set.

FIGS. 2 and 3 illustrate the face learning stage. The face learning stage includes a process of deriving sub-feature-vector set of the facial image, so as to establish and provide the feature-vector database 40.

Please refer to FIGS. 2 and 3. Initially, in order to perform the process of deriving sub-feature-vector set of the facial image, the user must move and adjust the image capturing device 30 to focus on their face, and then trigger the image capturing device 30 to capture a reference-face-image R of their face. Next the image capturing device 30 transmits the reference-face-image R to the data processing apparatus 20, as shown in Step 110.

The data processing apparatus 20 then performs a Gaussian Noise blur Reduction to the reference-face-image R to reduce noise blur in the reference-face-image R, as shown in Step 120.

It should be noted that Gaussian Noise blur Reduction is used for reducing noise blur, but it can be replaced with any other noise reduction. Alternatively, the noise blur reduction can be omitted if the reference-face-image R is captured under a well illuminated condition to reduce noise blur in the original reference-face-image R.

Please refer to FIGS. 2 and 3 again, in which the data processing apparatus 20 divides the reference-face-image R into N×N blocks, each of which is provided with a block ID, as shown Step 130.

Please refer to FIGS. 2 and 3, in which the data processing apparatus 20 analyses each pixel of each block and performs a local binary pattern process to each block. According to the variations among the pixels, the data processing apparatus 20 converts each block into sub-feature-vectors with M-dimensions, as shown in Step 140.

Please refer to FIGS. 2 and 3, in which in Step 150, N×N sub-feature-vectors can be obtained from the reference-face-image R. The data processing apparatus 20 combines these sub-feature-vectors into a reference sub-feature-vector set, so as to store the reference sub-feature-vector set in the feature-vector database 40.

Please refer to FIGS. 2 and 3, in which in Step 160, the data processing apparatus 20 stores the reference sub-feature-vector set in the feature-vector database 40.

These steps establish the reference sub-feature-vector set for subsequent comparison. The data processing apparatus 20 may accept the input of corresponding identification while the reference sub-feature-vector set is being established, so as to associate the reference sub-feature-vector set with a corresponding identification.

By means of these steps, the feature-vector database 40 is established. In other words, a feature-vector database 40 storing at least one reference sub-feature-vector set with its corresponding identification can be provided.

The following steps illustrate how to obtain an environmental-state-vector for the reference-face-image R.

Figure 4:
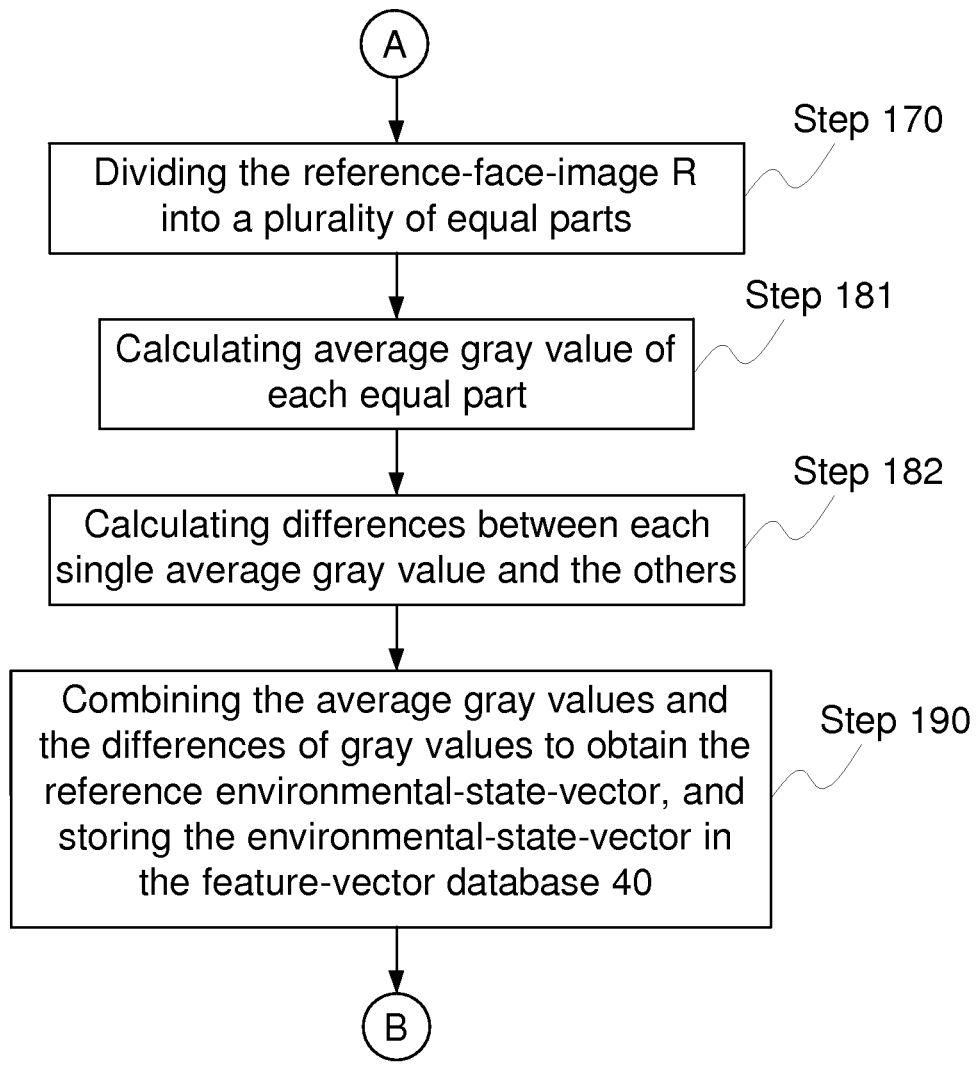
FIG. 4 is the second part of the flowchart of the facial recognition method of the present invention.
Figure 5:
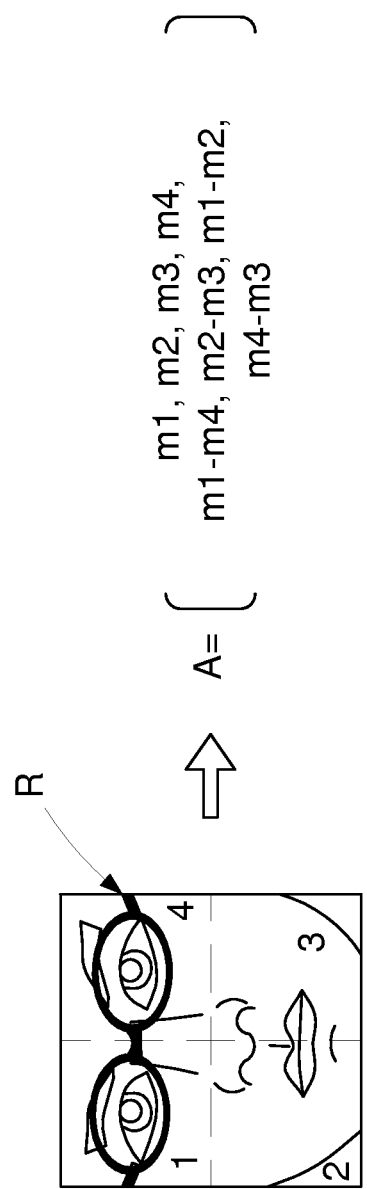
FIG. 5 is a schematic view of deriving the reference environmental-state-vector.

Please refer to FIGS. 4 and 5, in which initially, in Step 170, the data processing apparatus 20 divides the reference-face-image R into four equal parts, which are referred to as the first equal part 1, the second equal part 2, the third equal part 3 and the fourth equal part with counterclockwise starting from the top-left block.

Please refer to FIGS. 4 and 5, in which in Step 181, the data processing apparatus 20 respectively calculates four average gray values m1, m2, m3 and m4 of the four equal parts 1, 2, 3 and 4.

Please refer to FIGS. 4 and 5, in which in Step 182, the data processing apparatus 20 performs the following operations:

Subtracting the average gray value of the right equal part from the average gray value of the left equal part; and Subtracting the average gray value of the lower equal part from the average gray value of the upper equal part.

These operations are performed to obtain four differences of gray value (m1−m4), (m2−m3), (m1−m2) and (m4−m3). It should be noted that these operations are examples of calculating differences between each single average gray value and the others; the approach to calculating differences is not limited to above operations. And the quantity of the blocks is not limited to four (2×2), it may be 3×3, 4×4, etc.

In Step 190, the data processing apparatus 20 defines the average gray values (m1, m2, m3, m4) of the four equal parts and differences of gray values (m1−m4), (m2−m3), (m1−m2) and (m4−m3) to be values of dimensions of a reference environmental-state-vector (eight values of eight dimensions in this example), and combines these values to obtain the reference environmental-state-vector. The data processing apparatus 20 then stores the reference environmental-state-vector in the feature-vector database 40.

The face recognizing stage of the present invention is described below. Similarly, a process of deriving sub-feature-vector set of the facial image is performed to derive a current sub-feature-vector set. The current sub-feature-vector set is then compared with each of the reference sub-feature-vector sets in the feature-vector database 40.

Figure 6:
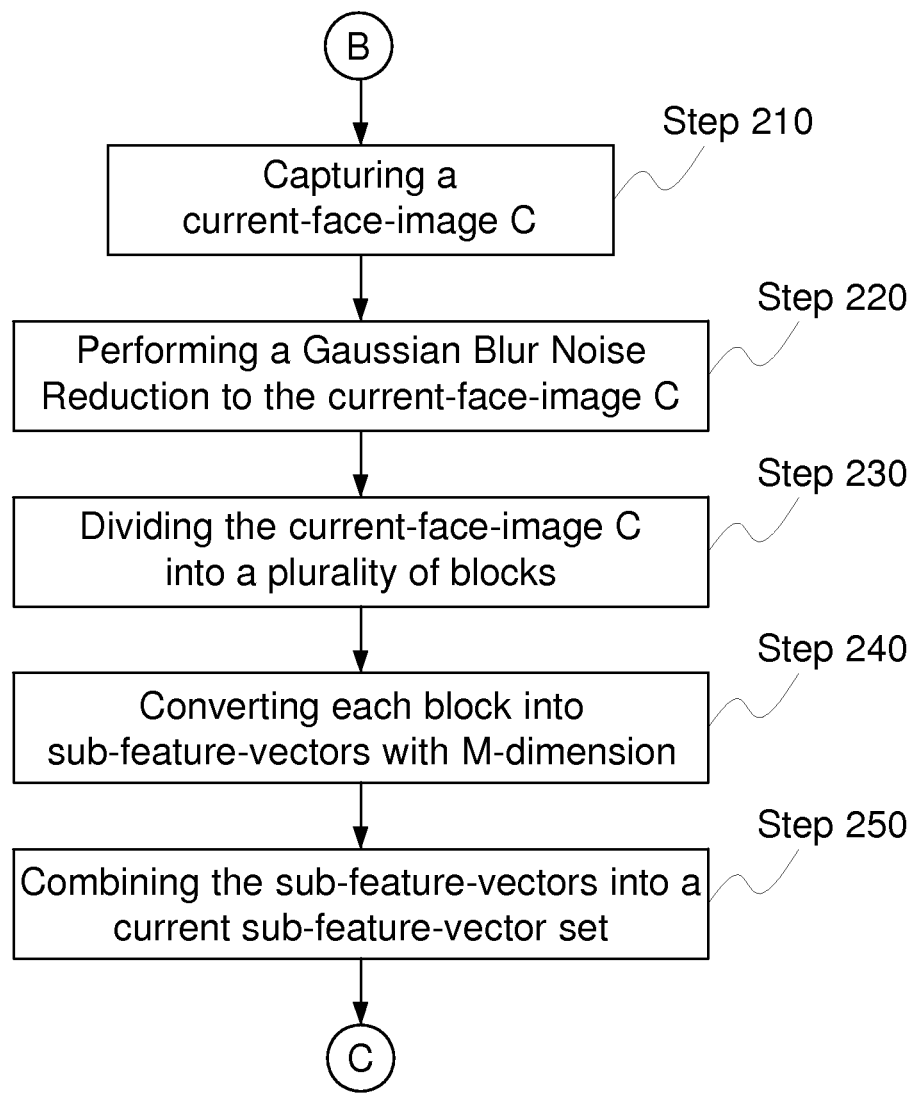
FIG. 6 is the third part of the flowchart of the facial recognition method of the present invention.
Figure 7:
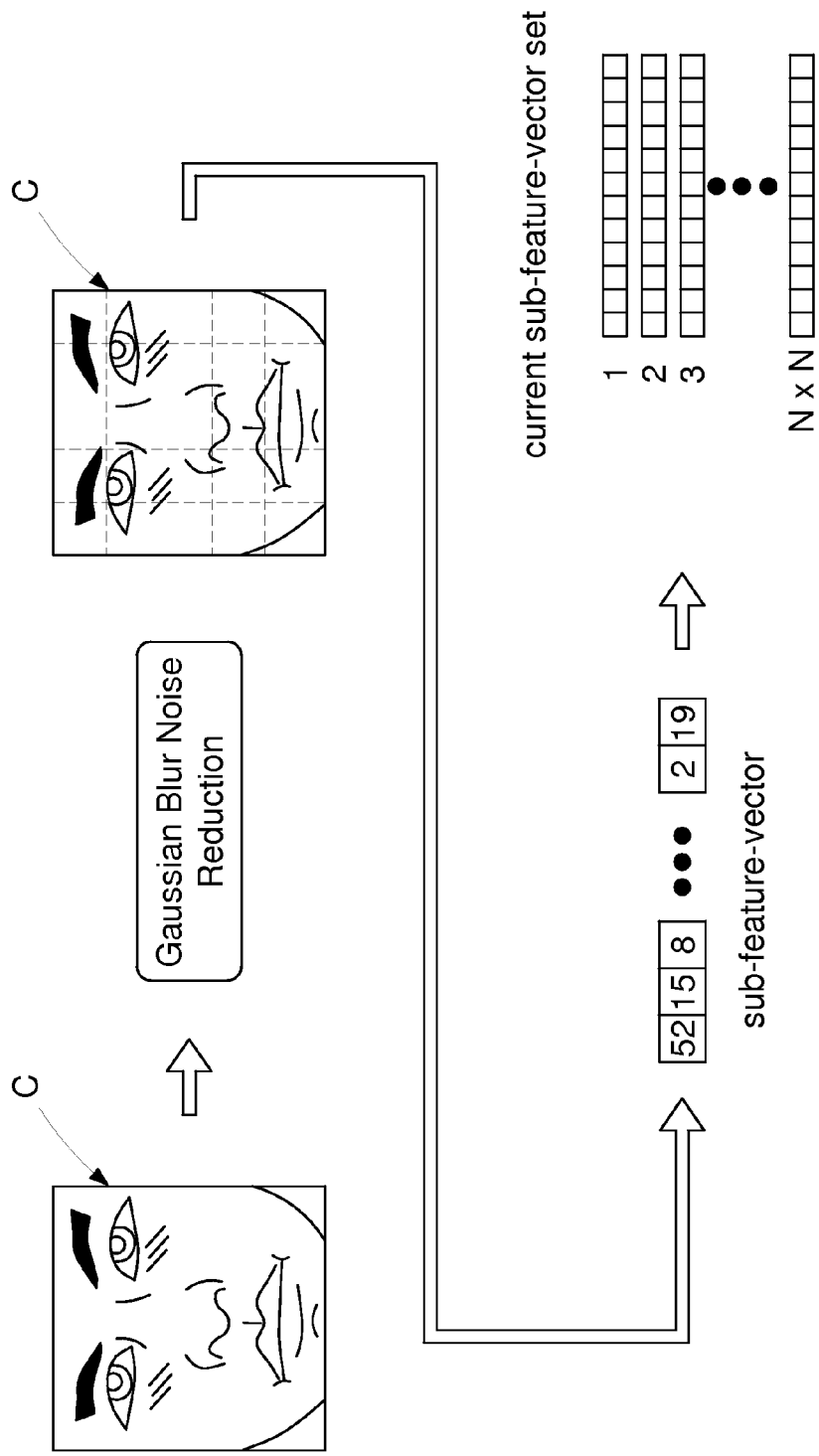
FIG. 7 is a schematic view of converting the current-face-image into a current sub-feature-vector set.

Please refer to FIGS. 6 and 7, in which the user moves and adjusts the image capturing device 30 to focus on their face, and then triggers the image capturing device 30 to capture a current-face-image C of their face. And then the image capturing device 30 transmits current-face-image C to the data processing apparatus 20, as shown in Step 210.

Please refer to FIGS. 6 and 7, in which in Step 220, the data processing apparatus 20 performs the Gaussian Noise blur Reduction to the current-face-image C for reducing noise blur in the current-face-image C. As described in Step 120, the Gaussian Noise blur Reduction is used for reducing noise blur, but it may be replaced with any other noise reduction method. Alternatively, the noise blur reduction may be omitted if the current-face-image C contains little noise blur because the current-face-image C is captured under well illuminated condition.

Please refer to FIGS. 6 and 7, in which in Step 230, the data processing apparatus 20 divides the current-face-image C into N×N blocks, each of the blocks is provided with a block ID.

Please refer to FIGS. 6 and 7, in which in Step 240, the data processing apparatus 20 analyses each pixel of each block and performs the local binary pattern process to each block. The data processing apparatus 20 converts each block into sub-feature-vectors with M-dimensions according to variations among the pixels.

Please refer to FIGS. 6 and 7, in which in Step 250, N×N sub-feature-vectors can be obtained from the current-face-image C. The data processing apparatus 20 combines these sub-feature-vectors into a current sub-feature-vector set.

Figure 8:
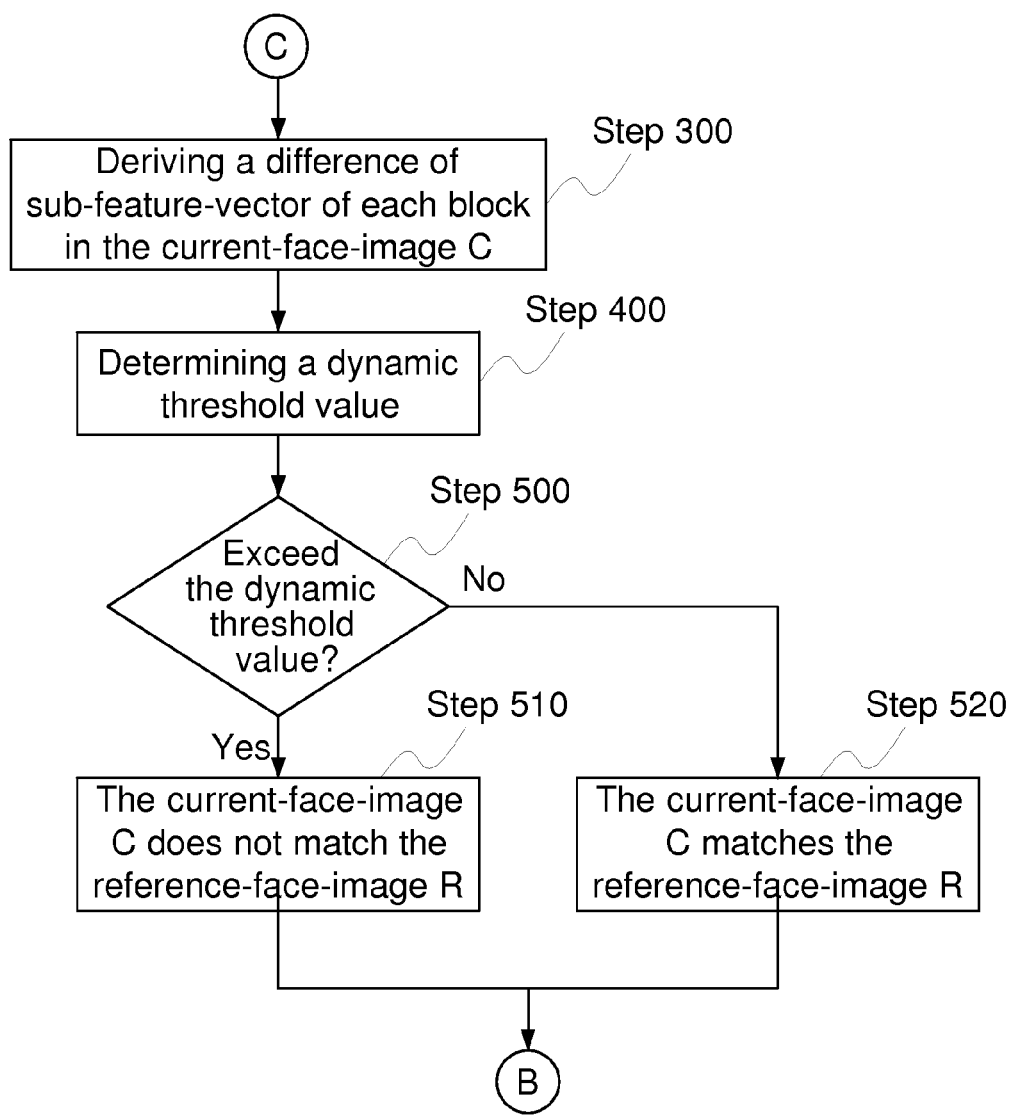
FIG. 8 is the fourth part of the flowchart of the facial recognition method of the present invention.
Figure 9:
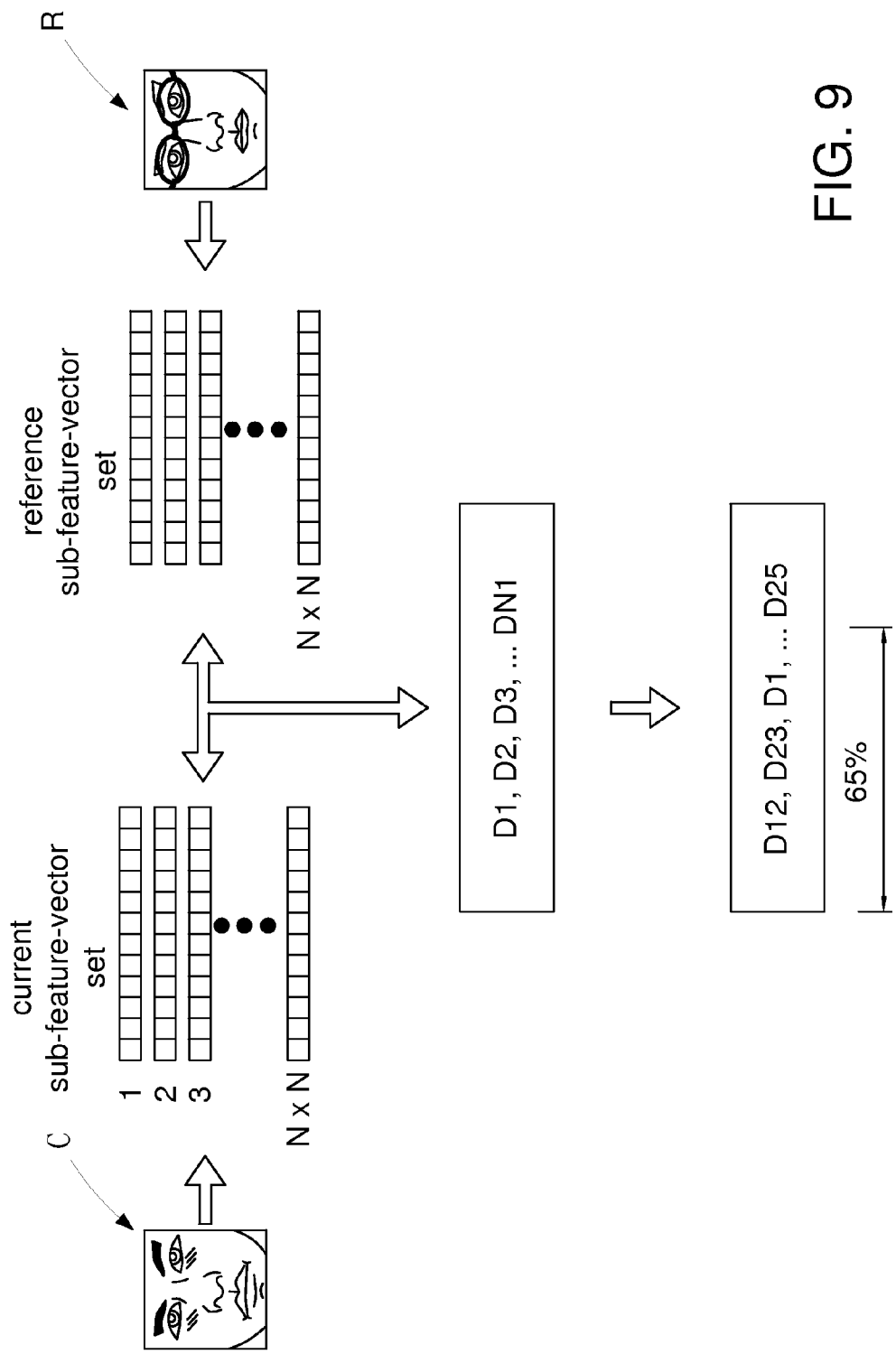
FIG. 9 is a schematic view of the adaptive facial features comparison.

Please refer to FIGS. 8 and 9, in which the data processing apparatus 20 compares each sub-feature-vector of the current sub-feature-vector set of the current-face-image C with a corresponding sub-feature-vector of the reference sub-feature-vector set of the reference-face-image R to derive a difference of sub-feature-vector of each block in the current-face-image C, as shown in Step 300.

Figure 10:
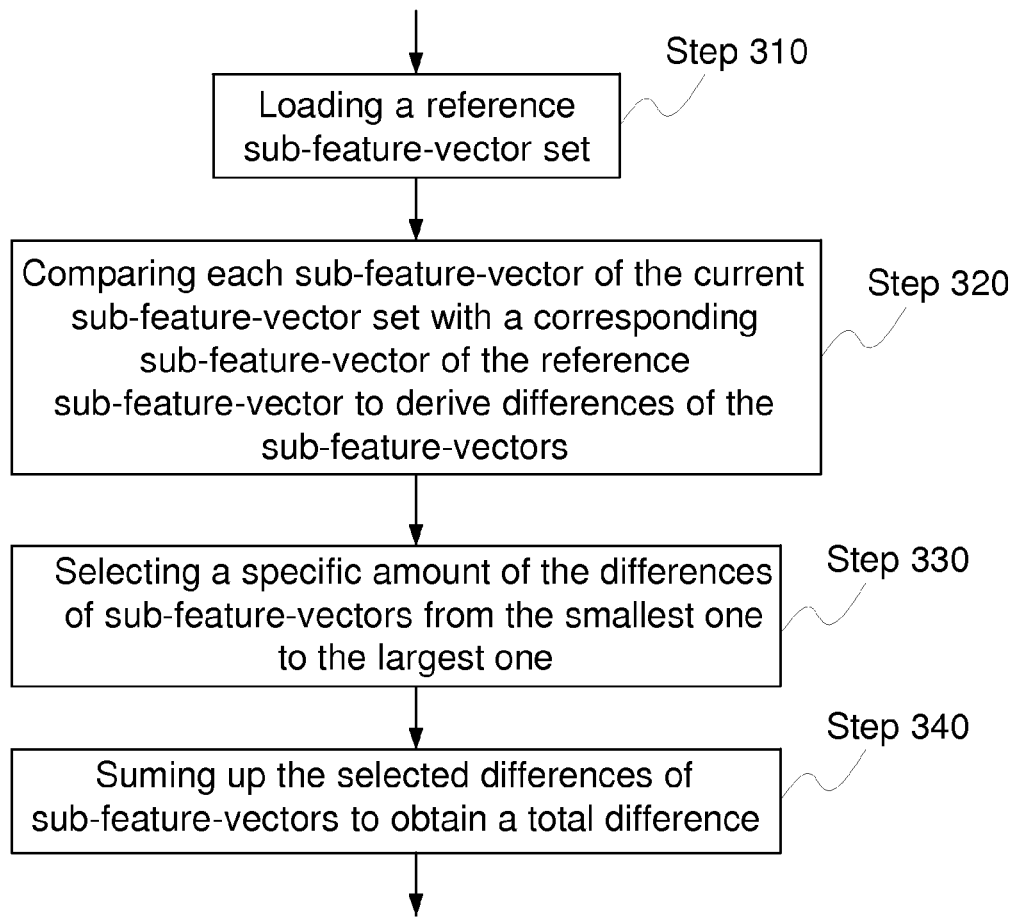
FIG. 10 is the fifth part of the flowchart of the facial recognition method of the present invention.

Please refer to FIG. 10, in which the adaptive facial features comparison in Step 300 is further described below.

Firstly, the data processing apparatus 20 loads a reference sub-feature-vector set from the feature-vector database 40, as shown in Step 310.

Next, the data processing apparatus 20 compares each sub-feature-vector of the current sub-feature-vector set with a corresponding sub-feature-vector with the same block ID of the reference sub-feature-vector to derive N×N differences of sub-feature-vectors, as shown in Step 320, As shown in Step 330, the data processing apparatus 20 sequences the differences of sub-feature-vectors in an order of quantity, and then selects a specific amount of the differences of sub-feature-vectors from the smallest one to the largest one. For example, the specific amount to select the differences of the sub-feature-vectors from smallest one to the largest one is 65% of all, wherein the differences with relative large values are abandoned.

In Step 340, the data processing apparatus 20 sums up the selected differences of sub-feature-vectors to obtain a total difference.

In the Step 330, the reason why the differences of sub-feature-vectors with relative large values are abandoned is that the sub-feature-vector of each block is affected by noise blur when the LBP in Steps 140 and 240 is being performed. The larger the differences are, the more serious the noise blur effect is. Thus the abandoned blocks are the parts which are more seriously affected by noise blur than the other. Usually, the abandoned blocks are shadows or fringes, and important facial features are probably retained.

In contrast, in a well illuminated area noise blur is reduced but some blocks lacking distinctiveness may be emphasized, such as smooth foreheads or cheeks. The weights of these sub-feature-vectors and their differences of sub-feature-vectors of those blocks lacking distinctiveness will also be enlarged. Thus under sufficient illumination abandoning larger differences of sub-feature-vectors will not omit important facial features. Instead, those important facial features may be emphasized.

Please refer back to FIG. 8, in which in Step 400, the data processing apparatus 20 determines a dynamic threshold value as a comparative standard for dynamic threshold comparison. More specifically, the dynamic threshold comparison is performed to determine whether the total difference between the current-face-image C and the sub-feature-vectors of the reference-face-image R in the feature-vector database 40 exceeds the dynamic threshold value or not. In other words, the purpose is to determine whether the differences between the current sub-feature-vector set and the reference sub-feature-vector set exceed the dynamic threshold value or not.

Figure 11:
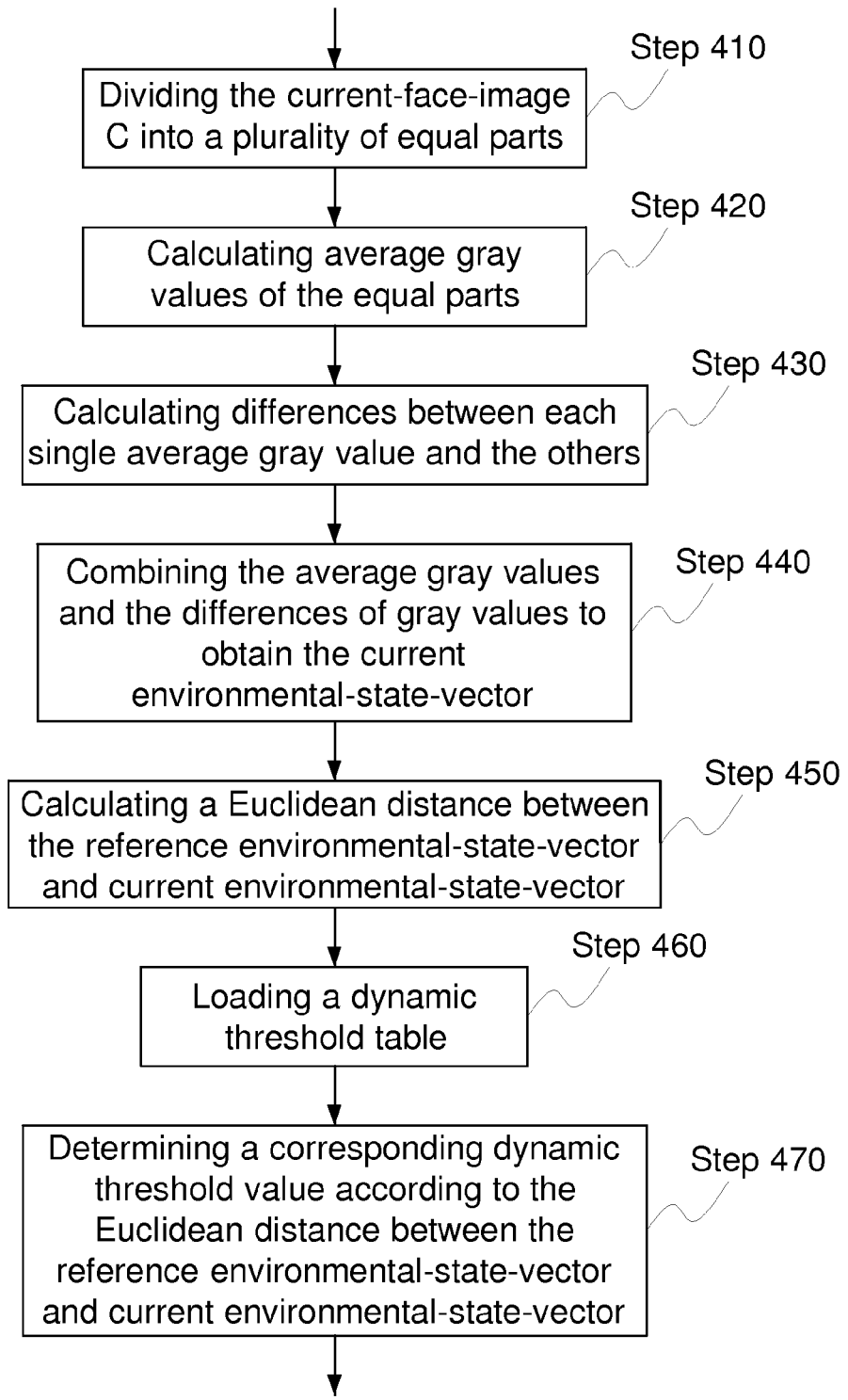
FIG. 11 is the sixth part of the flowchart of the facial recognition method of the present invention.
Figure 12:
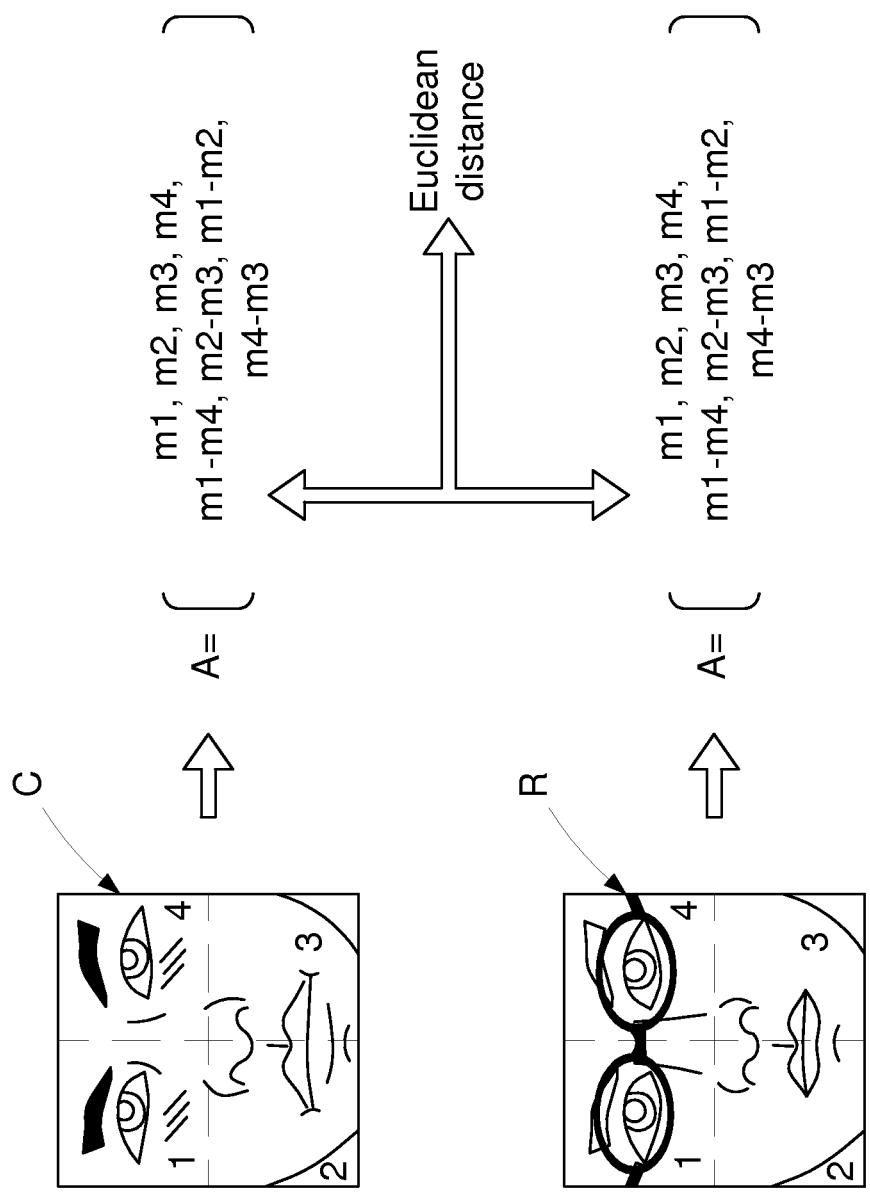
FIG. 12 is a schematic view of calculating a Euclidean distance to obtain a dynamic threshold value.

FIGS. 11 and 12 illustrate the details of Step 400.

Please refer to FIGS. 11 and 12, in which in Step 410, the data processing apparatus 20 divides the current-face-image C into four equal parts which are referred to as the first equal part 1, the second equal part 2, the third equal part 3 and the fourth equal part 4 with counterclockwise starting from the top-left block.

Please refer to FIGS. 11 and 12, in which in Step 420, the data processing apparatus 20 respectively calculates four average gray values m1, m2, m3 and m4 of the four equal parts 1, 2, 3 and 4.

Please refer to FIGS. 11 and 12, in which in Step 430, the data processing apparatus 20 calculates differences between each average gray value and the other average gray values, i.e. four differences of gray value (m1−m4), (m2−m3), (m1−m2) and (m4−m3).

In Step 440, the data processing apparatus 20 defines average gray values (m1, m2, m3, m4) of the four equal parts and differences of gray values (m1–m4), (m2–m3), (m1–m2) and (m4–m3) to be values of dimensions of a current environmental-state-vector, and combines these values to obtain the current environmental-state-vector.

In fact, Steps 410 to 440 are the same as Steps 160 to 190. The difference of the two sets of Steps is that the objects being performed are reference-face-image R and current-face-image C, respectively.

In Step 450, the data processing apparatus 20 calculates a Euclidean distance between the reference environmental-state-vector and current environmental-state-vector.

In Step 460, the data processing apparatus 20 loads a dynamic threshold table from the feature-vector database 40. The dynamic threshold table records a plurality of dynamic threshold values. Each dynamic threshold value is associated with Euclidean distances within a specific range. This previously mentioned dynamic threshold table may create relativity between each dynamic threshold value and Euclidean distance within a specific range after various environmental tests have been implemented.

In Step 470, the data processing apparatus 20 determines a corresponding dynamic threshold value from the feature-vector database 40 according to the Euclidean distance between the reference environmental-state-vector and current environmental-state-vector.

Please refer to FIG. 8, in which the data processing apparatus 20 determines whether or not the total difference exceeds the determined corresponding dynamic threshold value, as shown in Step 500.

If the total difference of the current sub-feature-vector set and the reference sub-feature-vector set exceeds the determined corresponding dynamic threshold value, the data processing apparatus 20 determines that the current-face-image C does not match the reference-face-image R, as shown in Step 510. In other words, the current-face-image C belongs to a stranger.

If the total difference of the current sub-feature-vector set and the reference sub-feature-vector set does not exceed the determined corresponding dynamic threshold value, the data processing apparatus 20 determines that the current-face-image C matches the reference-face-image R, as shown in Step 520. In other words, the current-face-image C belongs to an authorized user.

This previously mentioned recognition result and the identification corresponding to the reference sub-feature-vector set can be used to replace a log-in account ID and password for access control of the data processing apparatus 20, so as to simplify the procedure of accessing the operation authority of using the data processing apparatus 20.

Each of the dynamic threshold value reflects an environmental variation between two environments in which the current-face-image C and reference-face-image R are captured respectively. A dynamic threshold value is determined upon the environmental variation, therefore the present invention prevents the recognition standard from being too serious or lenient.

To perform more precise facial recognition, there are two approaches to modifying this embodiment.

The first one of the two approaches is multi-layer sampling procedure. The multi-layer sampling procedure is performed to increases the number of valid comparative samples by increasing the number of sub-feature-vectors of the current sub-feature-vector set and the reference sub-feature-vector set.

Figure 13:
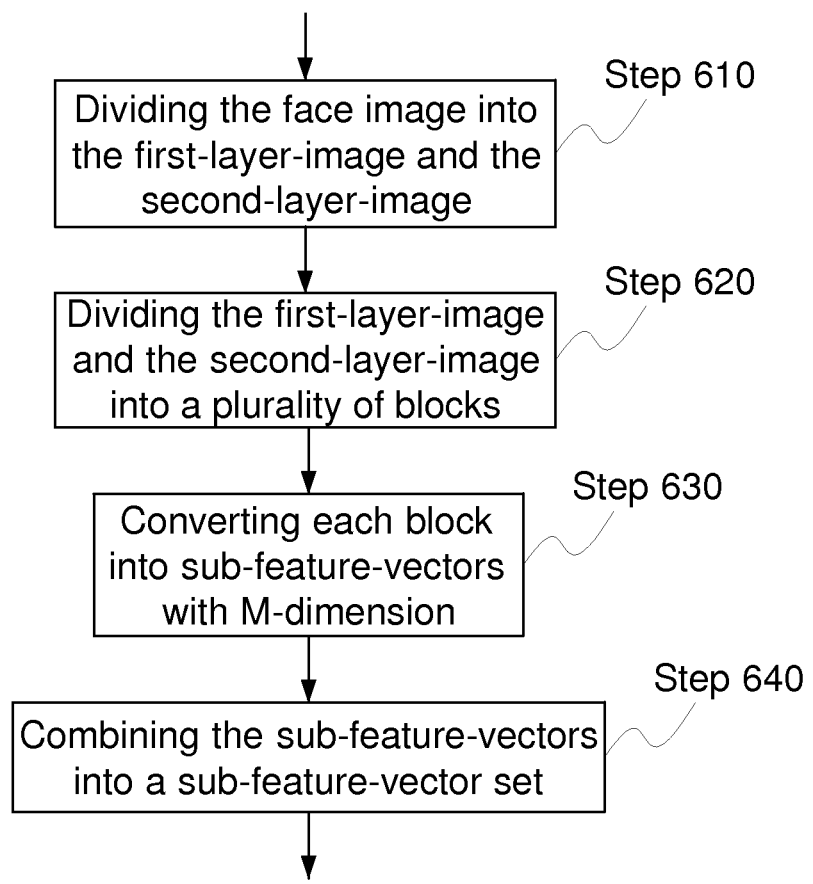
FIG. 13 is the seventh part of the flowchart of the facial recognition method of the present invention.
Figure 14:
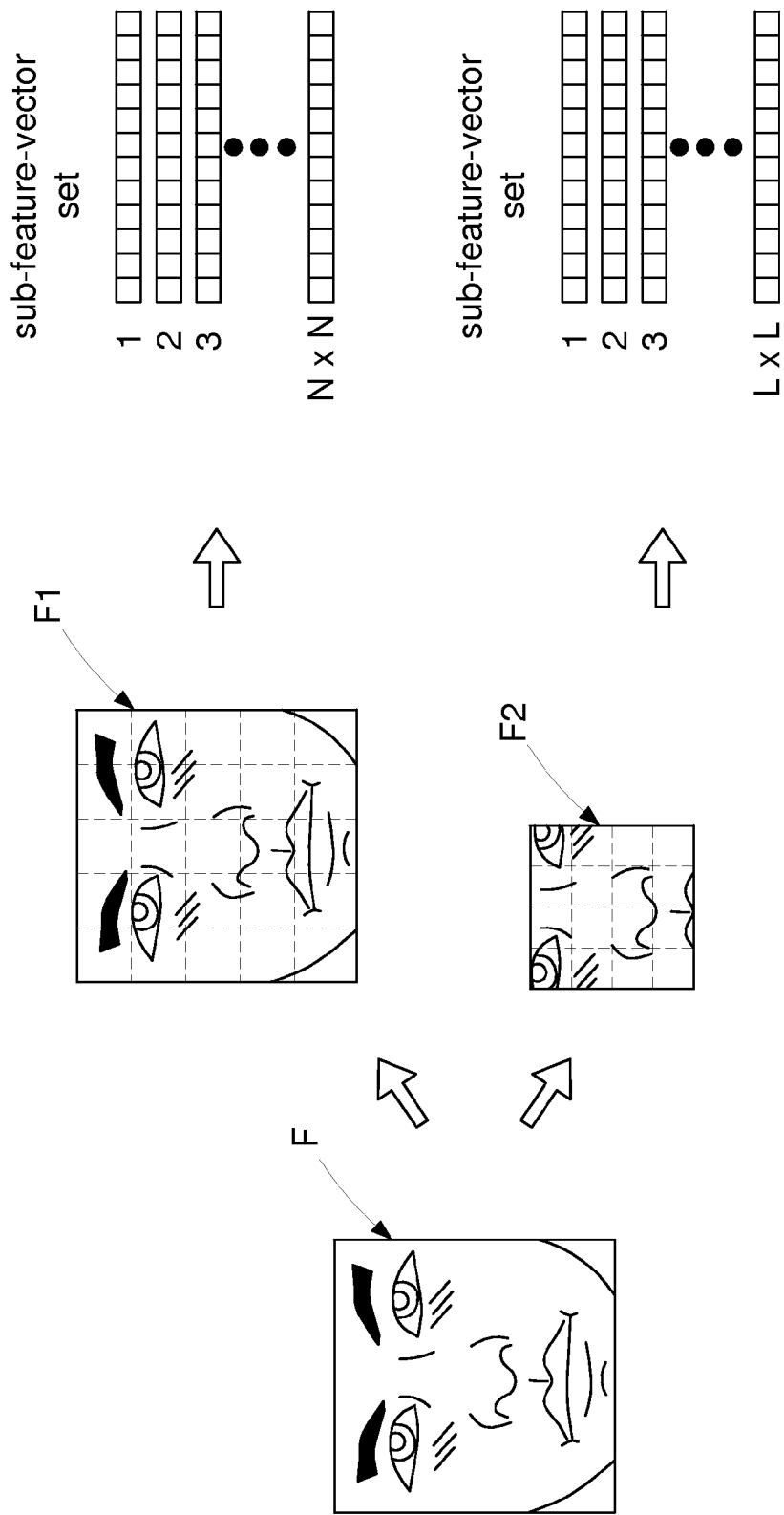
FIG. 14 is a schematic view of the multi-layer sampling.

Please refer to FIGS. 13 and 14, which illustrate the Steps of performing multi-layer sampling procedure. These Steps replace Steps 130-140 or Steps 230-240. Hereinafter, the current-face-image C and reference-face-image R will be jointly referred to as "facial image F".

After a facial image F is obtained and processed with noise reduction (i.e., after Steps 110-120 or Steps 210-220), the data processing apparatus 20 divides the facial image F into a first-layer-image F1 and a second-layer-image F2. The first-layer-image F1 is the original facial image F, and the second-layer-image F2 is a portion of the original facial image F such as a central portion, respectively, as shown in Step 610.

Please refer to FIGS. 13 and 14, in which in Step 620 the data processing apparatus 20 respectively divides the first-layer-image F1 and the second-layer-image F2 into a plurality of blocks. For example, the first-layer-image F1 and the second-layer-image F2 are divided into N×N and L×L blocks, respectively. Similarly, each block is provided with a block ID.

Please refer to FIGS. 13 and 14, in which in Step 630, the data processing apparatus 20 analyses each pixel of each block and performs the local binary pattern process to each block. The data processing apparatus 20 converts each block into sub-feature-vectors with M-dimensions according to changes of pixels.

Please refer to FIGS. 13 and 14, in which in Step 640, N×N plus L×L sub-feature-vectors can be obtained from the facial image F. All of L×L sub-feature-vectors come from the important portion having distinctive facial features so as to increase weight of facial features. The data processing apparatus 20 combines these sub-feature-vectors into a sub-feature-vector set, and stores it in the feature-vector database 40.

As a result, the number of sub-feature-vectors becomes N×N plus L×L instead of original N×N, and the L×L value comes from the portion having distinctive facial features. This can increase the weight of facial features.

The second of the two approaches is multi-sized sampling procedure. The multi-sized sampling procedure is performed to correct the Euclidean distance between the current-face-image C and the reference-face-image R stored in the feature-vector database for reducing noise blur effect.

Figure 15:
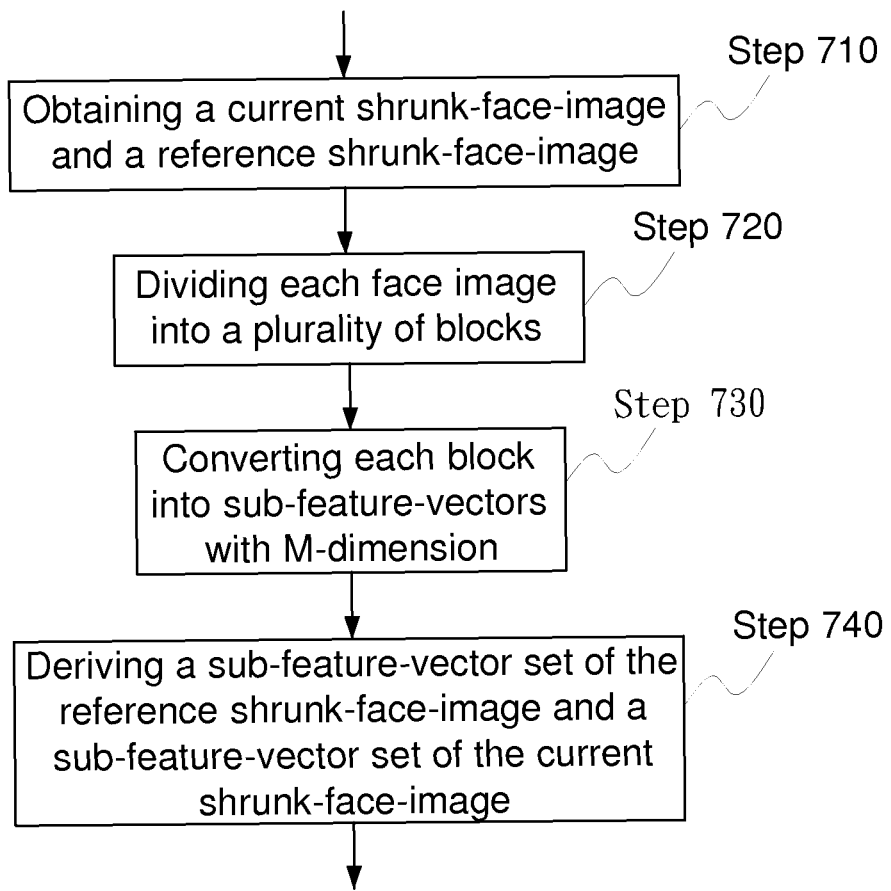
FIG. 15 is the eighth part of the flowchart of the facial recognition method of the present invention.
Figure 16:
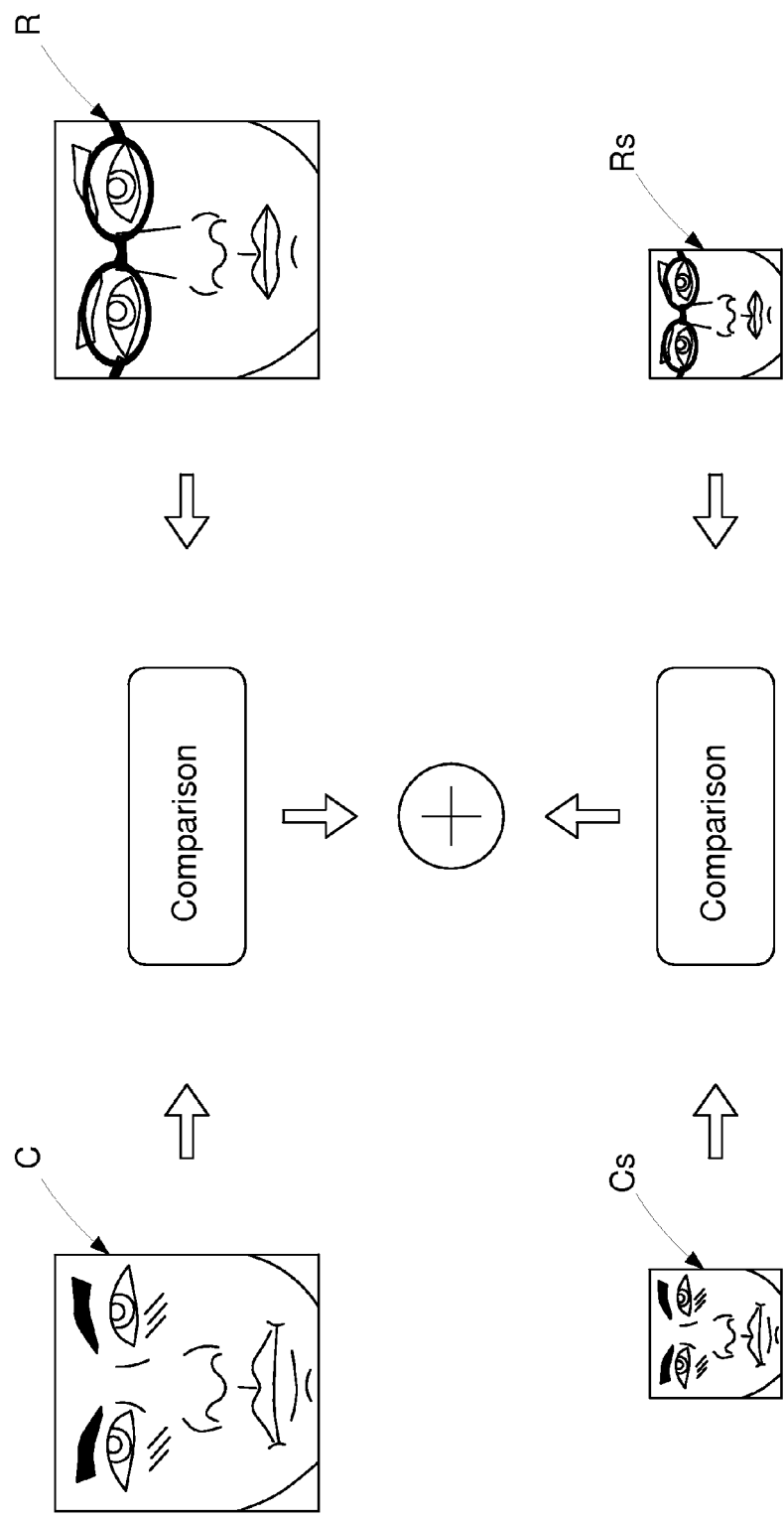
FIG. 16 is a schematic view of the multi-sized sampling.

FIGS. 15 and 16 illustrate the steps of multi-sized sampling procedure. These steps are introduced to replace Steps 130-140 or Steps 230-240.

Please refer to FIGS. 15 and 16, in which after a current-face-image C and a reference-face-image R are obtained (i.e., after Steps 110-120 or Steps 210-220), the data processing apparatus 20 further changes resolution of the current-face-image C and reference-face-image R to obtain a current reduced-size-image Cs and a reference reduced-size-image Rs, respectively, as shown in Step 710. During the process of forming reduced-size-images, noise blur can be reduced but the weight of facial features may also be lowered. Thus the original facial image F is still required in subsequent Steps.

As shown in FIG. 15, the data processing apparatus 20 respectively divides the reference-face-image R, current-face-image C, reference reduced-size-image Rs, and current reduced-size-image Cs into a plurality of blocks, and each of these blocks is provided with a block ID in Step 720.

Please refer to FIG. 15, in which in Step 730, the data processing apparatus 20 analyses each pixel of each block and performs the local binary pattern process to each block. The data processing apparatus 20 converts each block into sub-feature-vectors with M-dimensions according to variations among the pixels.

Please refer to FIGS. 15 and 16. The data processing apparatus 20 respectively derives a sub-feature-vector set of the reference reduced-size-image Rs and a sub-feature-vector set of the current reduced-size-image Cs to find out a difference of sub-feature-vector of each block in the sub-feature-vector set of the current reduced-size-image Cs in Step 740.

Figure 17:
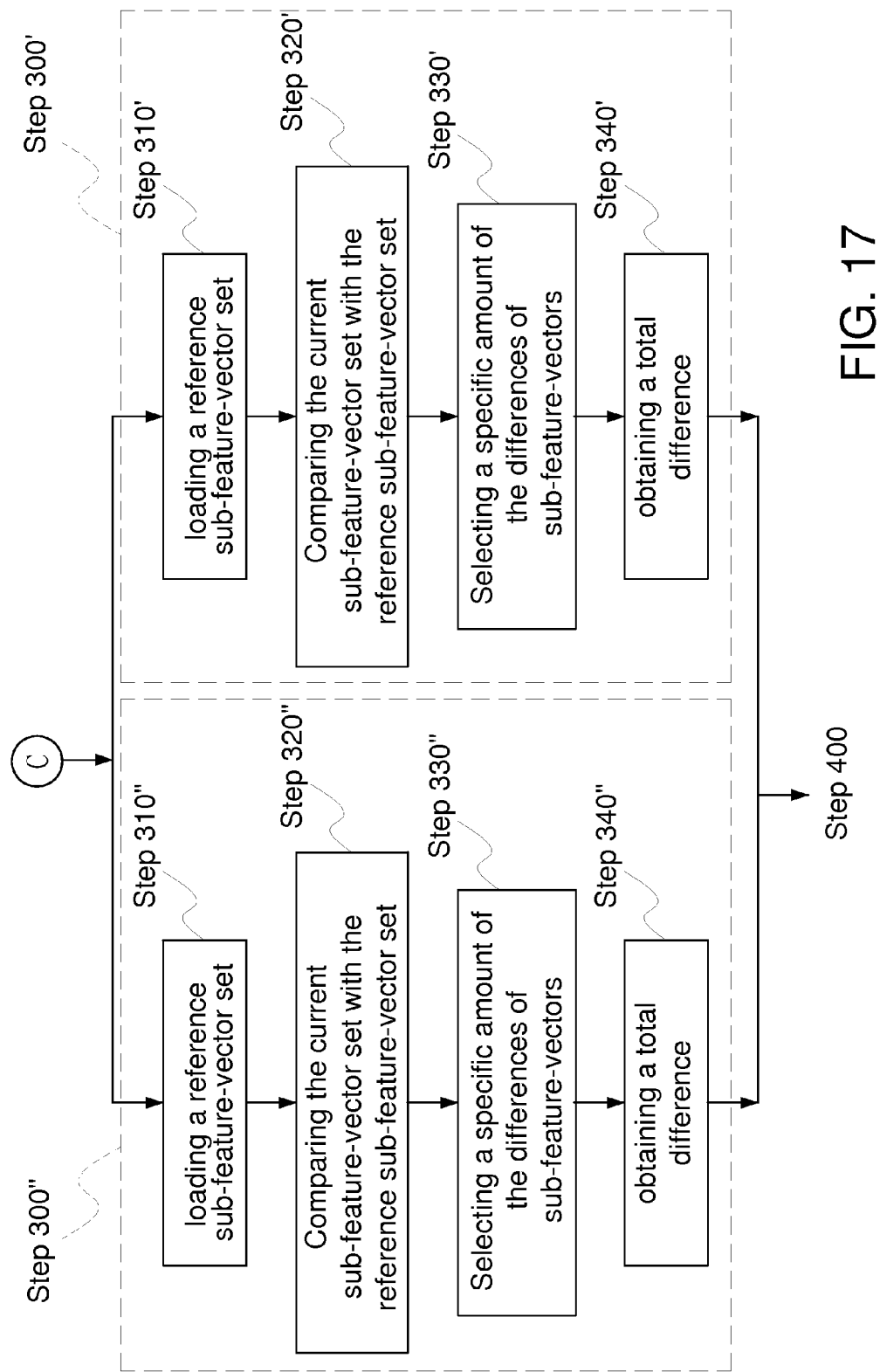
FIG. 17 is the ninth part of the flowchart of the facial recognition method of the present invention.

Please refer to FIGS. 16 and 17, in which the original Step 300 for performing an adaptive facial features comparison to each sub-feature-vector set in the feature-vector database 40 and the current sub-feature-vector set of the current-face-image C, is divided into two parallel branches, i.e. Step 300' and Step 300".

Please refer to FIGS. 16 and 17, in which the Step 300' is to derive differences of sub-feature-vectors of each block in the current-face-image C, i.e. Steps 310'-340' are the same as Steps 310-340.

Please refer to FIGS. 16 and 17, in which the Step 300" is to derive differences of sub-feature-vectors of each block of the sub-feature-vector set in the current reduced-size-image Cs, i.e. Steps 310"-340" are the same as Steps 310-340 but differ in the current reduced-size-image Cs and reference reduced-size-image Rs being as the comparative objects.

Finally, the difference of sub-feature-vector of each block derived from the current reduced-size-image Cs is added to the difference derives from the current-face-image C to obtain a finally total difference. The finally total difference is employed in Step 500 to compare with a dynamic threshold value.

The facial recognition method of the present invention takes environmental variations into consideration so as to modify the dynamic threshold value in every comparison. This enables the dynamic threshold value to match environmental variations and improve the reliability of facial recognition.

While the present invention has been described by the way of example and in terms of the preferred embodiments, it is to be understood that the present invention need not to be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A facial recognition method for eliminating the effect of noise blur and environmental variations to determine whether a current-face-image matches a reference-face-image or not, the facial recognition method comprising the following steps of:

providing a feature-vector database storing a reference sub-feature-vector set of the reference-face-image, a reference environmental-state-vector and a dynamic threshold table;

capturing the current-face-image;

deriving a current sub-feature-vector set of the current-face-image;

comparing, by an data processing apparatus, each sub-feature-vector of the current sub-feature-vector set with a corresponding sub-feature-vector of the reference sub-feature-vector set, to obtain a difference between each sub-feature-vector of the current sub-feature-vector set and the corresponding sub-feature-vector of the reference sub-feature-vector set;

sequencing the differences of the sub-feature-vectors in an order of quantity;

selecting a specific amount of the differences of the sub-feature-vectors from smallest one to the largest one and summing up the selected differences of the sub-feature-vectors to obtain a total difference;

deriving a current environmental-state-vector of the current-face-image;

calculating a Euclidean distance between the reference environmental-state-vector and the current environmental-state-vector;

determining a corresponding dynamic threshold value from the dynamic threshold table according to the Euclidean distance between the reference environmental-state-vector and the current environmental-state-vector, wherein the dynamic threshold table records a plurality of dynamic threshold values, and each of the dynamic threshold values is associated with Euclidean distances within a specific range; and determining whether the total difference exceeds the determined corresponding dynamic threshold value and determining the current-face-image matches the reference-face-image if the total difference does not exceed the determined corresponding dynamic threshold value.

2. The facial recognition method as claimed in claim 1, wherein the step of deriving the reference sub-feature-vector set or the current sub-feature-vector set further comprises the steps of:

capturing a reference-face-image or a current-face-image by an image capturing device;

transmitting the reference-face-image or the current-face-image to the data processing apparatus;

performing noise blur reduction to the reference-face-image or the current-face-image by the data processing apparatus;

dividing the reference-face-image or the current-face-image into a plurality of blocks by the data processing apparatus; and performing a local binary pattern process to each block, to convert each of the blocks into a corresponding sub-feature-vector, and combining the sub-feature-vectors into a sub-feature-vector set by the data processing apparatus.

3. The facial recognition method as claimed in claim 2, further comprising the steps after the step of capturing the reference-face-image or the current-face-image:

dividing the reference-face-image or the current-face-image into the first-layer-image and the second-layer-image by the data processing apparatus, wherein the first-layer-image is the reference-face-image or the current-face-image, and the second-layer-image is a portion of the reference-face-image or the current-face-image; and dividing the first-layer-image and the second-layer-image into a plurality of blocks respectively.

4. The facial recognition method as claimed in claim 2, wherein the noise blur reduction method is Gaussian Noise blur Reduction.

5. The facial recognition method as claimed in claim 1, further comprising the steps of:

changing the resolution of the current-face-image and the reference-face-image to obtain a current reduced-size-image and a reference reduced-size-image, respectively;

deriving a sub-feature-vector set of the reference reduced-size-image and a sub-feature-vector set of the current reduced-size-image, to obtain a difference between each sub-feature-vector of current reduced-size-image and the corresponding sub-feature-vector of the reference reduced-size-image; and summing up the differences of sub-feature-vector derived from the current reduced-size-image to the total difference obtained from the current-face-image.

6. The facial recognition method as claimed in claim 1, wherein the reference sub-feature-vector set is associated with a corresponding identification.

7. The facial recognition method as claimed in claim 1, wherein the step of deriving the reference environmental-state-vector or the current environmental-state-vector further comprises the steps of:
  dividing the reference-face-image or the current-face-image into a plurality of equal parts;
  respectively calculating an average gray value of each of the equal parts;
  calculating differences between each average gray value and the other average gray values; and
  taking the average gray values and the differences between each average gray value and the other average gray values to serve as values of each dimension, and combining the values of each dimension into the environmental-state-vector.

8. The facial recognition method as claimed in claim 1, wherein the step to obtain a difference between each sub-feature-vector of the current sub-feature-vector set and the corresponding sub-feature-vector of the reference sub-feature-vector set further comprises the steps of:
  loading the reference sub-feature-vector set from the feature-vector database by the data processing apparatus; and
  comparing each of the sub-feature-vectors in the reference sub-feature-vector set with the corresponding sub-feature-vector in the current sub-feature-vector set, to obtain the differences of sub-feature-vectors.

9. The facial recognition method as claimed in claim 1, wherein the specific amount to select the differences of the sub-feature-vectors from smallest to largest is 65% of the total.

* * * * *